(12) United States Patent
Keohane et al.

(10) Patent No.: US 7,712,660 B2
(45) Date of Patent: *May 11, 2010

(54) METHOD TO DISABLE USE OF SELECTED APPLICATIONS BASED ON PROXIMITY OR USER IDENTIFICATION

(75) Inventors: Susann Marie Keohane, Austin, TX (US); Gerald Francis McBrearty, Austin, TX (US); Shawn Patrick Mullen, Buda, TX (US); Jessica Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/350,426

(22) Filed: Jan. 8, 2009

(65) Prior Publication Data
US 2009/0150194 A1    Jun. 11, 2009

Related U.S. Application Data

(63) Continuation of application No. 11/197,611, filed on Aug. 4, 2005, now Pat. No. 7,490,763.

(51) Int. Cl.
*G06K 5/00* (2006.01)
*G06F 7/04* (2006.01)

(52) U.S. Cl. .......................................... 235/382; 726/2
(58) Field of Classification Search ................. 235/382; 726/2; 455/456.1, 456.3, 410; 380/258
See application file for complete search history.

(56) References Cited

U.S. PATENT DOCUMENTS

| | | | |
|---|---|---|---|
| 5,778,304 | A | 7/1998 | Grube et al. |
| 5,790,074 | A | 8/1998 | Rangedahl et al. |
| 6,502,022 | B1 | 12/2002 | Chastain et al. |
| 6,823,188 | B1 | 11/2004 | Stern |
| 7,000,116 | B2 | 2/2006 | Bates et al. |
| 7,080,402 | B2 | 7/2006 | Bates et al. |
| 2005/0090267 | A1 | 4/2005 | Kotzin |
| 2005/0266857 | A1 | 12/2005 | Poikela |
| 2006/0031830 | A1 | 2/2006 | Chu et al. |

FOREIGN PATENT DOCUMENTS

| | | |
|---|---|---|
| WO | 2004064003 A1 | 7/2004 |
| WO | 2004111825 A1 | 12/2004 |

*Primary Examiner*—Daniel A Hess
(74) *Attorney, Agent, or Firm*—Yee & Associates, P.C.; Matthew W. Baca

(57) ABSTRACT

An application for disabling the use of selected applications is provided. A server receives identification information from a user. The location of the user is determined. If the user is determined to be in a reserved location, the use of one or more applications is disabled, for the user.

11 Claims, 3 Drawing Sheets

METHOD TO DISABLE USE OF SELECTED APPLICATIONS BASED ON PROXIMITY OR USER IDENTIFICATION

This application is a continuation of application Ser. No. 11/197,611, filed Aug. 4, 2005, now U.S. Pat. No. 7,490,763 status allowed.

BACKGROUND OF THE INVENTION

1. Field of the Invention

The present invention relates generally to an improved data processing system. More specifically, the present invention provides a method, system and computer program product for disabling use of selected applications.

2. Description of the Related Art

The Internet, also referred to as an "internetwork," is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies that must interact with virtually all segments of society, such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web." Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files. Examples of data files include text, still graphic images, audio, and motion video. The information in various data files is formatted for presentation to a user by a standard page description language, the Hypertext Markup Language (HTML).

In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page," is identified by a URL. The URL provides a universal, consistent method for finding and accessing this information, not necessarily for the user, but mostly for the user's Web "browser." A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet has revolutionized communications and commerce, as well as being a source of both information and entertainment. For many users, email is a widely used format to communicate over the Internet. Additionally, the Internet is also used for real-time voice conversations.

The Internet also is widely used to transfer applications to users of Web browsers. With respect to commerce on the Web, individual consumers and businesses use the Web to purchase various goods and services. In offering goods and services, some companies offer goods and services solely on the Web, while others use the Web to extend their reach. Many companies also use a number of different types of networks, such as for example, an intranet, a local area network (LAN), or a wide area network (WAN), which can also be used to transfer applications and information to various users.

In many environments, such as meetings, a classroom setting, or in movie theaters, for example, use of certain applications, such as e-mail and chat sessions, may distract from the focus of the meeting. Currently there is not a good way to prevent such applications from being used in such environments.

SUMMARY OF THE INVENTION

The present invention provides a method, system, and computer program product for disabling use of selected applications. Identification information is received about a user. The location of the user is determined, forming a determined location. Responsive to a determination that the determined location is a reserved location, the use of one or more applications is disabled for the user associated with the identification information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
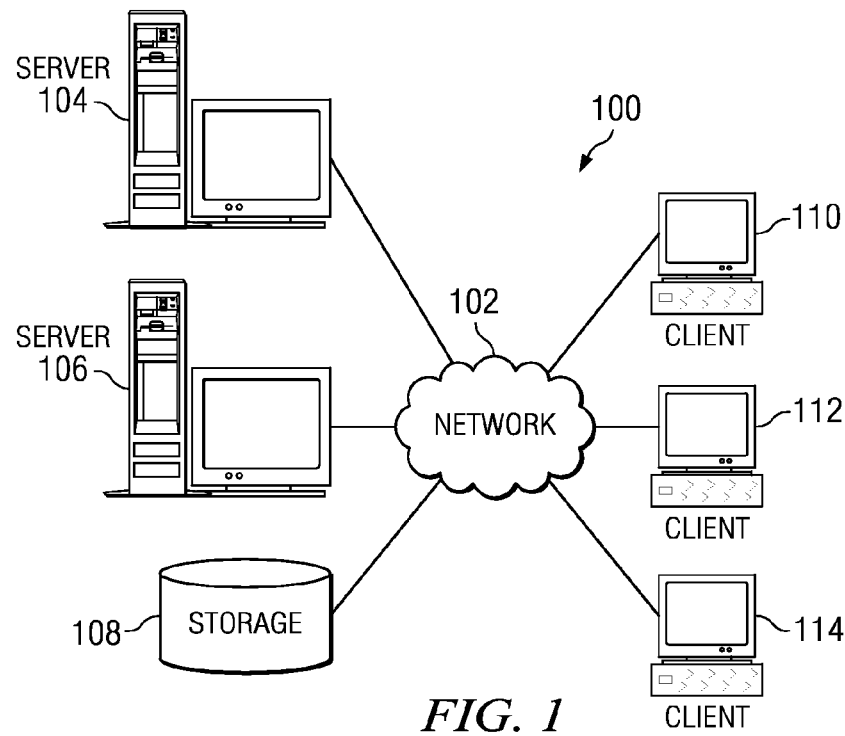
FIG. 1 is a pictorial representation of a network of data processing systems in which aspects of the present invention may be implemented.
Figure 2:
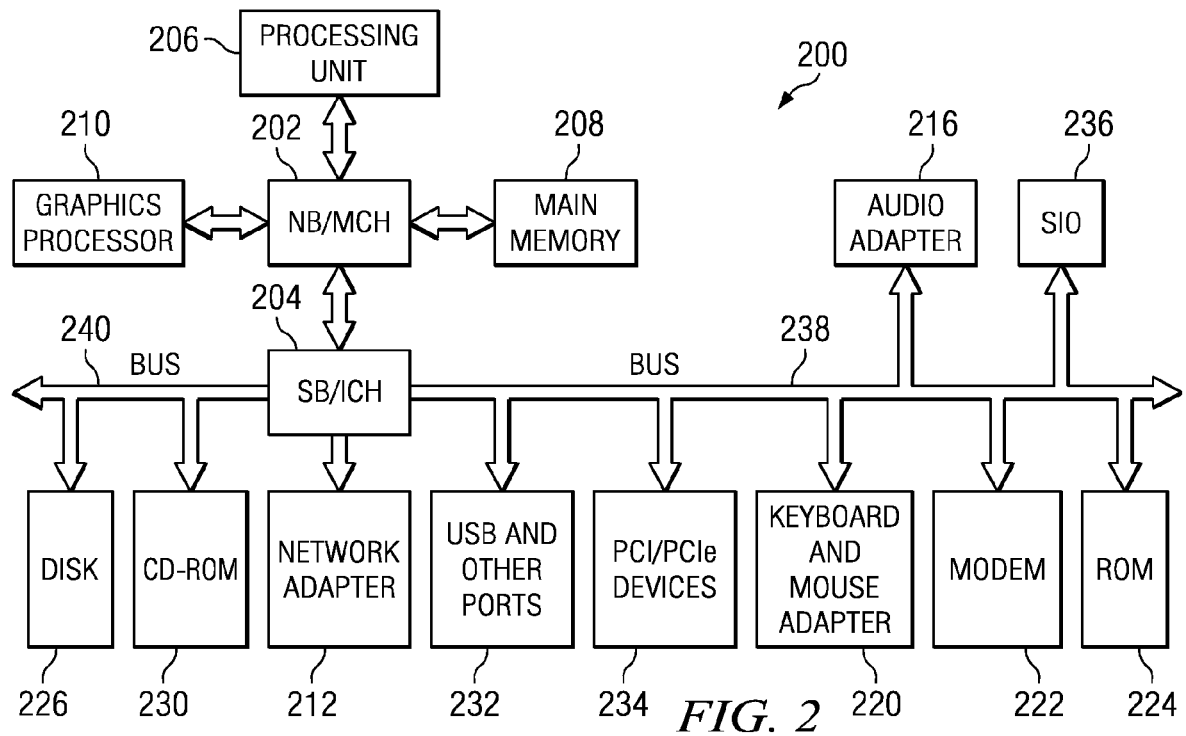
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
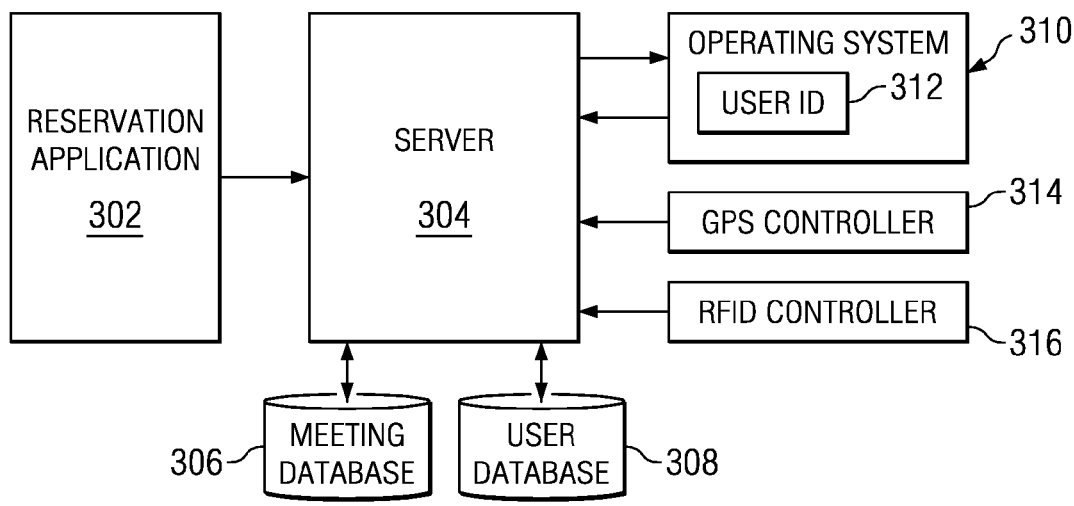
FIG. 3 is an exemplary functional block diagram depicting a system for disabling use of certain applications during a meeting.

While in meetings, or in other environments, such as a class room or a movie theater, for example, use of certain applications, such as e-mail and chat sessions, distract from the focus of the meeting. FIG. 3 is an exemplary functional block diagram depicting a system for disabling use of certain applications during a meeting. A planner uses reservation application 302 to schedule a meeting. Reservation application 302 allows the planner to reserve a room, at a specific time, on a specific date, and to list what application programs, such as e-mail and chat sessions, for example, are to be disabled during the meeting. In an alternate exemplary embodiment, a list of intended attendees, along with their user identifications (user IDs), are included in the information the planner provides to reservation application 302. Reservation application 302 communicates this reservation information to server 304, where the reservation information is stored in meeting database 306. Server 304 may be implemented as data processing system 200 in FIG. 2, for example.

In an exemplary embodiment of the present invention, a radio frequency identification (RFID) is used to determine whether a user should have their application programs disabled. RFID controller communicates the RFID information to server 304. As the location of the access point for RFID controller is known, server 304 checks meeting database 306 to determine if a meeting is scheduled in a room associated with the access point for RFID controller 316. If a meeting is scheduled for the room associated with the access point for RFID controller 316, server 304 looks up the user ID associated with the RFID in user database 308. Server 304 then looks up which applications are to be disabled in meeting database 306.

In an exemplary embodiment of the present invention, server 304 communicates with the service providing servers of the applications that are to be disabled, and provides the user ID obtained from user database 308. The service providing servers then deny the user ID access to the services.

In another exemplary embodiment of the present invention, server 304 communicates with a client data processing system belonging to the possessor of the user ID. Server 304 tells the client data processing system which applications are to be disabled. The applications are then disabled on the client data processing system. Disabling the applications can be done through use of a firewall denying the applications access to the service providing servers, or by disabling access to the data ports of the client data processing system, or by any other means or methods known in the art.

In another exemplary embodiment of the present invention. RFID controller 316 communicates the RFID information to server 304. Server 304 looks up the user ID associated with the RFID in user database 308. Server 304 then checks meeting database 306 to see if the user ID is on a list of user IDs of intended attendees of a meeting where application programs are to be disabled.

In an exemplary embodiment of the present invention, if the user ID is on the list of user IDs of intended attendees of a meeting where application programs are to be disabled, server 304 communicates with the service providing servers of the applications that are to be disabled, and provides the user ID obtained from user database 308. The service providing servers then deny the user ID access to the services.

In another exemplary embodiment of the present invention, if the user ID is on the list of user IDs of intended attendees of a meeting where application programs are to be disabled, server 304 communicates with a client data processing system belonging to the possessor of the user ID. Server 304 tells the client data processing system which applications are to be disabled. The applications are then disabled on the client data processing system. Disabling the applications can be done through use of a firewall denying the applications access to the service providing servers, or by disabling access to the data ports of the client data processing system, or by any other means or methods known in the art.

In an exemplary embodiment of the present invention, the location of a global positioning system (GPS) device is used to determine whether a user should have their application programs disabled. The GPS is a worldwide radio-navigation system formed from a constellation of satellites and their ground stations.

GPS controller 314 communicates with server 304 telling server 304 the GPS device ID and GPS device location. Server 304 queries meeting database 306 to see if the GPS device location matches a location where a meeting is scheduled. If a meeting is scheduled for the location of the GPS device, server 304 looks up the user ID associated with the GPS device ID in user database 308. Server 304 then looks up which applications are to be disabled in meeting database 306.

In an exemplary embodiment of the present invention, server 304 communicates with the service providing servers of the applications that are to be disabled, and provides the user ID obtained from user database 308. The service providing servers then deny the user ID access to the services.

In another exemplary embodiment of the present invention, server 304 communicates with a client data processing system belonging to the possessor of the user ID. Server 304 tells the client data processing system which applications are to be disabled. The applications are then disabled on the client data processing system. Disabling the applications can be done through use of a firewall denying the applications access to the service providing servers, or by disabling access to the data ports of the client data processing system, or by any other means or methods known in the art.

In another exemplary embodiment of the present invention, GPS controller 314 communicates the GPS device ID information to server 304. Server 304 looks up the user ID associated the GPS device ID in user database 308. Server 304 then checks meeting database 306 to see if the user ID is on the list of user IDs of intended attendees of a meeting where application programs are to be disabled.

In an exemplary embodiment of the present invention, if the user ID is on the list of user IDs of intended attendees of a meeting where application programs are to be disabled, server 304 communicates with the service providing servers of the applications that are to be disabled, and provides the user ID obtained from user database 308. The service providing servers then deny the user ID access to the services.

In another exemplary embodiment of the present invention, if the user ID is on the list of user IDs of intended attendees of a meeting where application programs are to be disabled, server 304 communicates with a client data processing system belonging to the possessor of the user ID. Server 304 tells the client data processing system which applications are to be disabled. The applications are then disabled on the client data processing system. Disabling the applications can be done through use of a firewall denying the applications access to the service providing servers, or by disabling access to the data ports of the client data processing system, or by any other means or methods known in the art.

In another exemplary embodiment of the present invention, a user's identification is used to determine whether the user should have their application programs disabled. Reservation application 302 communicates the reservation information to server 304. Server 304 stores the information in meeting database 306. Server 304 communicates with the service providing servers of the applications that are to be disabled, and provides the user IDs of the intended attendees of a meeting where application programs are to be disabled. The user IDs may be supplied by the planner, as part of the reservation information, or the user IDs may be looked up in user database 308. At the time of the meeting, the service providing servers then deny the listed user IDs access to the services for the duration of the meeting.

In another alternate embodiment of the present invention, instead of communicating with the service providing servers of the applications that are to be disabled, server 304 communicates with client data processing systems belonging to the listed user IDs. Server 304 tells the client data processing system which applications are to be disabled. At the time of the meeting, the applications are then disabled on the client data processing system, itself, for the duration of the meeting. Disabling the applications can be done through use of a firewall denying the applications access to the service providing servers, or by disabling access to the data ports of the client data processing system, or by any other means or methods known in the art.

In another exemplary embodiment of the present invention, the physical location of the meeting room is used to determine whether the user should have their application programs disabled. The location of the meeting room is stored in meeting database 306. Server 304 queries database 306 to get the location of the meeting room. Server 304 then determines the physical names and/or addresses of all the communication ports and data ports, both wired and wireless, associated with the meeting room. Server 304 monitors for any activity from these ports during the time of the meeting. When server 304 detects activity from one of the data or communication ports in the meeting room during the meeting, server 304 obtains user ID 312 from the client data processing system OS 310.

In an exemplary embodiment of the present invention, server 304 communicates with the service providing servers of the applications that are to be disabled, and provides the user ID 312. The service providing servers then deny user ID 312 access to the services.

In another exemplary embodiment of the present invention, server 304 communicates with a client data processing system belonging to the possessor of user ID 312. Server 304 tells the client data processing system which applications are to be disabled. The applications are then disabled on the client data processing system, itself. Disabling the applications can be done through use of a firewall denying the applications access to the service providing servers, or by disabling access to the data ports of the client data processing system, or by any other means or methods known in the art.

In another exemplary embodiment of the present invention, once server 304 obtains user ID 312 from the client data processing system OS 310, server 304 queries meeting database 306 to determine if user ID 312 is on the list of user IDs of intended attendees of a meeting where application programs are to be disabled.

In an exemplary embodiment of the present invention, if user ID 312 is on the list of user IDs of intended attendees of a meeting where application programs are to be disabled, server 304 communicates with the service providing servers of the applications that are to be disabled, and provides user ID 312. The service providing servers then deny user ID 312 access to the services.

In another exemplary embodiment of the present invention, if the user ID 312 is on the list of user IDs of intended attendees of a meeting where application programs are to be disabled, server 304 communicates with a client data processing system belonging to the possessor of user ID 312. Server 304 tells the client data processing system which applications are to be disabled. The applications are then disabled on the client data processing system. Disabling the applications can be done through use of a firewall denying the applications access to the service providing servers, or by disabling access to the data ports of the client data processing system, or by any other means or methods known in the art.

An additional feature that may be implemented in all the above exemplary embodiments is allowing a user to enable the disabled applications, provided the user is not attending the meeting. In another exemplary embodiment, the list of applications to be disabled is configurable for each intended attendee of the meeting. For example, the planner might need to allow himself to receive e-mails during the meeting in case important information might be sent, or for other various reasons.

Figure 4:
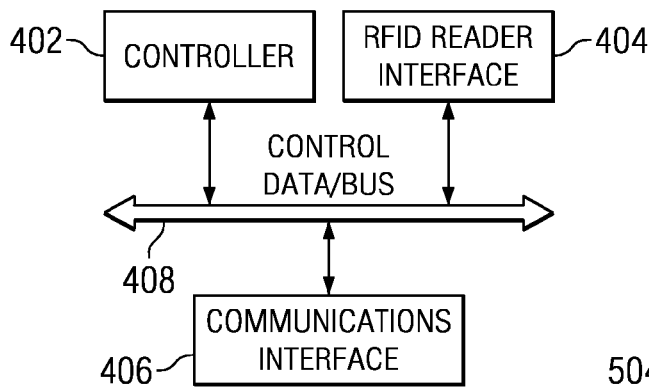
FIG. 4 is an exemplary functional block diagram of a RFID reader/controller in which aspects of the present invention may be implemented.

FIG. 4 is an exemplary functional block diagram of a RFID reader/controller in which aspects of the present invention may be implemented. The elements of the functional block diagram of FIG. 4 may be implemented as hardware, software, or a combination of hardware and software components.

As shown in FIG. 4, the RFID reader/controller, which may be implemented as RFID controller 316 in FIG. 3, for example, includes controller 402, RFID reader interface 404, and communications interface 406. These elements are in communication with one another via control/data bus 410. Although a bus architecture is shown in FIG. 4, the present invention is not limited to such and any architecture allowing for the communication of control messages and data between the elements 402, 404, and 406 may be used without departing from the spirit and scope of the present invention.

Controller 402 controls the overall operation of the RFID reader/controller. RFID reader interface 404 receives an RFID signal. Controller 402 receives identification information from RFID reader interface 404 corresponding to the signal received. Controller 402 then passes the identification information through communications interface 410 to a remote server. Communications interface 410 may be any kind of communications interface including wireless communications interfaces.

Figure 5:
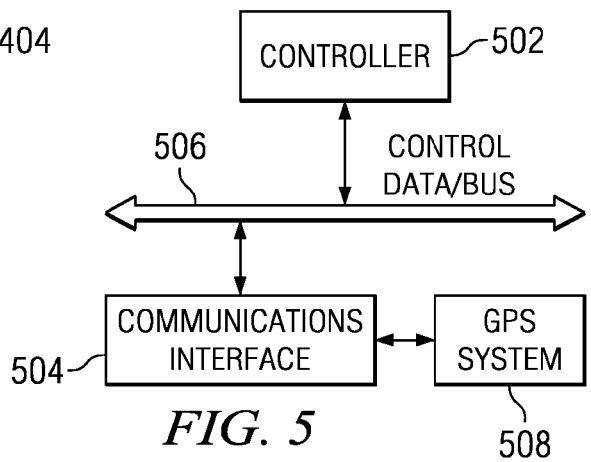
FIG. 5 is an exemplary functional block diagram of a GPS controller in which aspects of the present invention may be implemented.

FIG. 5 is an exemplary functional block diagram of a GPS controller in which aspects of the present invention may be implemented. The elements of the functional block diagram of FIG. 5 may be implemented as hardware, software, or a combination of hardware and software components.

As shown in FIG. 5, the GPS controller, which may be implemented as RFID controller 316 in FIG. 3, for example, includes controller 502 and communications interface 504.

These elements are in communication with one another via control/data bus 506. Although a bus architecture is shown in FIG. 5, the present invention is not limited to such and any architecture allowing for the communication of control messages and data between the elements 502 and 504 may be used without departing from the spirit and scope of the present invention.

Controller 502 controls the overall operation of the GPS controller. Controller 502 communicates with GPS system 508 through communications interface 504. GPS system 508 is a worldwide radio-navigation system formed from a collection of satellites and their ground stations. Communications interface 504 may be any kind of communications interface including wireless communications interfaces. Controller 502 sends pseudo random code through communications interface 504 to GPS system 508. GPS system 508 returns a location to controller 502.

Figure 6:
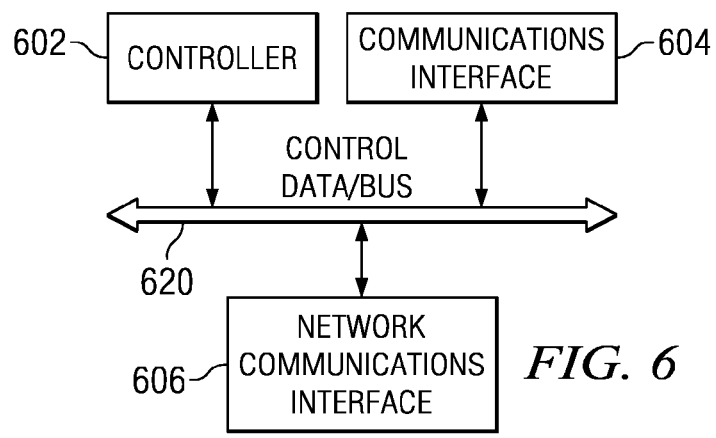
FIG. 6 is an exemplary functional block diagram of an access point in which aspects of the present invention may be implemented.

FIG. 6 is an exemplary functional block diagram of an access point in which aspects of the present invention may be implemented. The elements of the functional block diagram of FIG. 6 may be implemented as hardware, software, or a combination of hardware and software components.

As shown in FIG. 6, the access point includes controller 602, communications interface 604, and network communications interface 606. Communications interface 606 may be any kind of communications interface including wireless communications interfaces. These elements are in communication with one another via the control/data bus 620. Although bus architecture is shown in FIG. 6, the present invention is not limited to such and any architecture allowing for the communication of control messages and data between the elements 602-606 may be used without departing from the spirit and scope of the present invention.

Controller 602 controls the overall operation of the access point. The controller communicates with an RFID reader/controller or a GPS controller through communications interface 604 and routes this communications to a network through network communications interface 606. While the access point may be implemented using a well-known and readily available access point, the access point of the present invention may also be implemented as a specialized device.

Figure 7:
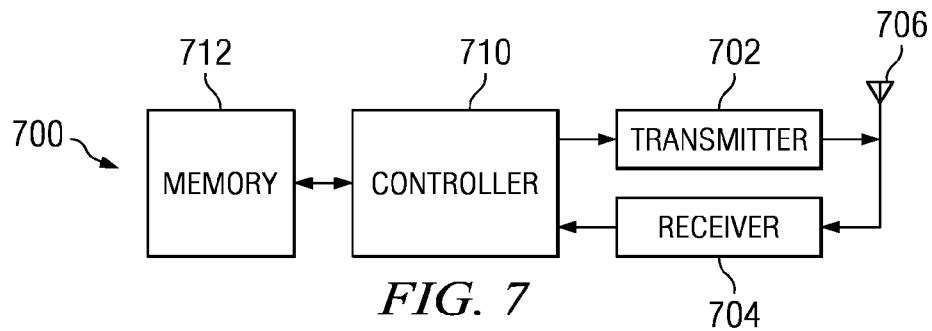
FIG. 7 illustrates a simple RFID device in which aspects of the present invention may be implemented.

FIG. 7 illustrates a simple RFID device in which aspects of the present invention may be implemented. RFID 700 includes transmitter 702 and receiver 704 that communicate through antenna 706. Controller 710, which may be implemented as controller 402 in FIG. 4, for example, receives information from receiver 704 and transmits information through transmitter 702. Identification information is stored in memory 712, which may be, for example, a static memory, such as a read-only memory (ROM). When polled through receiver 704, controller 710 transmits identification information from memory 712 through transmitter 702.

While FIG. 7 illustrates a simple RFID device in which aspects of the present invention may be implemented, the present invention is not limited to such a device and any current or future RFID device may be used without departing from the spirit and scope of the present invention.

Figure 8:
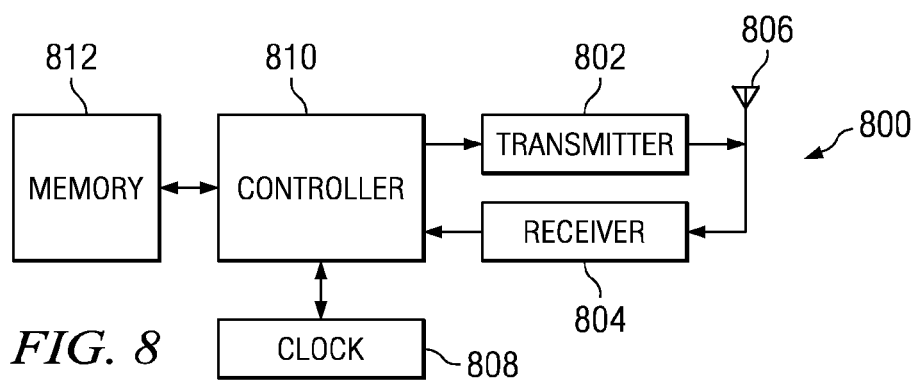
FIG. 8 illustrates a simple GPS device in which aspects of the present invention may be implemented.

FIG. 8 illustrates a simple GPS device in which aspects of the present invention may be implemented. GPS 800 includes transmitter 802 and receiver 804 that communicate through antenna 806. Controller 810 which may be implemented as controller 502 in FIG. 5, receives information from receiver 804 and clock 808 and transmits information through transmitter 802. Pseudo random code is stored in memory 812, which may be, for example, a static memory, such as a read-only memory (ROM). When polled through receiver 804, controller 810 transmits pseudo random code from memory 812 through transmitter 802.

While FIG. 8 illustrates a simple GPS device in which aspects of the present invention may be implemented, the present invention is not limited to such a device and any current or future GPS device may be used without departing from the spirit and scope of the present invention.

Figure 9:
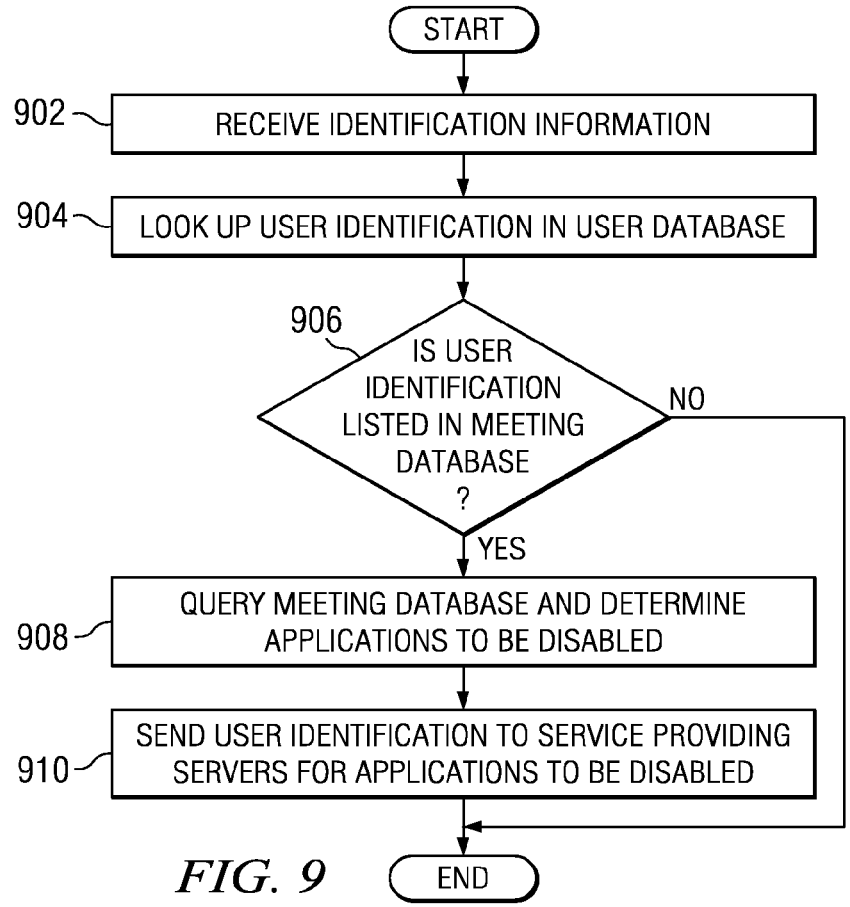
FIG. 9 is flowchart illustrating the operation of disabling applications during a meeting in accordance with exemplary aspects of the present invention.

FIG. 9 is flowchart illustrating the operation of disabling applications during a meeting in accordance with exemplary aspects of the present invention. Operation begins when a server, such as server 304 in FIG. 3, for example, which may be implemented as data processing system 200 in FIG. 2, for example, receives identification information (step 902). Identification information may comprise RFID information, GPS device identification and location, or a user ID. The server looks up the identification information in a user database in order to determine the user ID associated with the identification information (step 904). In the case where the identification information comprises a user ID, step 904 is skipped. The server determines if the user ID is listed as an intended attendee of a meeting in which applications are to be disabled in a meeting database (step 906). If the user ID is not listed as an intended attendee of a meeting in which applications are to be disabled (a no output to step 906), the operation ends.

If the user ID is listed as an intended attendee of a meeting in which applications are to be disabled (a yes output to step 906), the server queries the meeting database to determine which applications are to be disable for the meeting (step 908). The server sends the user ID to the service providing servers for the applications to be disabled along with instructions not to allow the user ID to have access to the applications for the course of the meeting (step 910). Then the operation ends.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer usable medium including computer usable program code for disabling use of selected applications, the computer program product comprising:

computer usable program code for receiving identification information from a user;

computer usable program code for determining a location of the user to form a determined location;

computer usable program code, responsive to a determination that the determined location is a reserved location, for determining a meeting associated with the reserved location;

computer usable program code for determining one or more applications to disable at the reserved location for the user associated with the identification information based on the meeting; and computer usable program code for disabling use of the one or more applications, at the reserved location, for the user associated with the identification information for a duration of the meeting.

2. The computer program product of claim 1, further comprising:

computer usable program code for determining a user identification associated with the identification information.

3. The computer program product of claim 2, further comprising:

computer usable program code for determining whether the user identification is one of a plurality of user identifications, wherein each user identification of the plurality of user identifications is associated with the reserved location.

4. The computer program product of claim 3, wherein the one or more applications to be disabled varies as a function of each user identification of the plurality of user identifications.

5. The computer program product of claim 1, wherein the one or more applications to be disabled are associated with the reserved location.

6. The computer program product of claim 1, wherein disabling the use of the one or more applications, at the reserved location, for the user associated with the identification information for a duration of the meeting comprises a service providing server disabling the use of the one or more applications, at the reserved location, for the user associated with the identification information.

7. The computer program product of claim 1, wherein the computer usable program code for disabling the use of the one or more applications, at the reserved location, for the user associated with the identification information for the duration of the meeting, is executed by a client data processing system.

8. A data processing system for disabling use of selected applications, the data processing system comprising:

a storage device, wherein the storage device stores computer usable program code; and a processor, wherein the processor executes the computer usable program code to receive identification information from a user; determine a location of the user to form a determined location; responsive to a determination that the determined location is a reserved location, determine a meeting associated with the reserved location; determine one or more applications to disable at the reserved location for the user associated with the identification information based on the meeting; and disable use of the one or more applications, at the reserved location, for the user associated with the identification information for a duration of the meeting.

9. The data processing system of claim 8, wherein the processor further executes computer usable program code to determine a user identification associated with the identification information.

10. The data processing system of claim 9, wherein the processor further executes computer usable program code to determine whether the user identification is one of a plurality of user identifications, wherein each user identification of the plurality of user identifications is associated with the reserved location.

11. The data processing system of claim 10, wherein the one or more applications to be disabled varies as a function of each user identification of the plurality of user identifications.

* * * * *